(12) United States Patent
Cho et al.

(10) Patent No.: US 11,119,259 B2
(45) Date of Patent: Sep. 14, 2021

(54) FLEXIBLE COLOR FILTER (71) Applicant: DONGWOO FINE-CHEM CO., LTD., Jeollabuk-do (KR)

(72) Inventors: Sung Hoon Cho, Gyeonggi-do (KR);
Sang Kook Kim, Gyeonggi-do (KR);
Seong Hwan Park, Gyeonggi-do (KR);
Seung June Park, Gyeonggi-do (KR)

(73) Assignee: Dongwoo Fine-Chem Co., Ltd., Jeollabuk-do (KR)

( * ) Notice: Subject to any disclaimer, the term of this patent is extended or adjusted under 35 U.S.C. 154(b) by 396 days.

(21) Appl. No.: 16/086,837

(22) PCT Filed: Dec. 13, 2016

(86) PCT No.: PCT/KR2016/014608
§ 371 (c)(1),
(2) Date: Sep. 20, 2018

(87) PCT Pub. No.: WO2017/171200
PCT Pub. Date: Oct. 5, 2017

(65) Prior Publication Data
US 2019/0086593 A1  Mar. 21, 2019

(30) Foreign Application Priority Data

Mar. 31, 2016 (KR) .......................... 10-2016-0039479

(51) Int. Cl.
| | | |
|---|---|---|
| C08G 61/04 | (2006.01) | |
| G02B 5/20 | (2006.01) | |
| G01J 3/51 | (2006.01) | |
| B32B 7/12 | (2006.01) | |
| B32B 27/08 | (2006.01) | |
| C09D 165/00 | (2006.01) | |
| C08G 61/08 | (2006.01) | |
| G02B 1/14 | (2015.01) | |

(52) U.S. Cl.
CPC ................ *G02B 5/201* (2013.01); *B32B 7/12* (2013.01); *B32B 27/08* (2013.01); *C08G 61/04* (2013.01); *C09D 165/00* (2013.01); *G01J 3/51* (2013.01); *B32B 2457/206* (2013.01); *B32B 2551/00* (2013.01); *C08G 61/08* (2013.01); *C08G 2261/124* (2013.01); *C08G 2261/228* (2013.01); *C08G 2261/3323* (2013.01); *C08G 2261/3324* (2013.01); *C08G 2261/3325* (2013.01); *C08G 2261/418* (2013.01); *C08G 2261/724* (2013.01); *G02B 1/14* (2015.01)

(58) Field of Classification Search
CPC combination set(s) only.
See application file for complete search history.

(56) References Cited

U.S. PATENT DOCUMENTS

| | | |
|---|---|---|
| 2009/0251643 A1 | 10/2009 | Yamada et al. |
| 2009/0316084 A1 | 12/2009 | Yajima et al. |

FOREIGN PATENT DOCUMENTS

| | | |
|---|---|---|
| CN | 1914271 A | 2/2007 |
| CN | 103675975 A | 3/2014 |
| KR | 2008-0054345 A | 6/2008 |
| KR | 10-2008-0062595 | 7/2008 |
| KR | 2008-0066673 A | 7/2008 |
| KR | 1020080062595 * | 7/2008 |
| KR | 2010-0047029 A | 5/2010 |
| KR | 10-2012-0082729 | 7/2012 |

OTHER PUBLICATIONS

International Search Report and Written Opinion from counterpart International Application No. PCT/KR2016/014608 dated Feb. 20, 2017.
First Office Action dated Apr. 2, 2020, received in conesponding Chinese Application No. 2016800825711, and its English translation.

* cited by examiner

*Primary Examiner* — Monique R Peets
(74) *Attorney, Agent, or Firm* — DLA Piper LLP (US)

(57) ABSTRACT

The present invention relates to a flexible color filter. More specifically, the present invention is characterized in that a separation layer, a protective layer, a black matrix layer and a pixel layer are sequentially laminated, wherein the protective layer comprises one or more polymers selected from polymers represented by chemical formula 1 or chemical formula 2.

6 Claims, 3 Drawing Sheets

FLEXIBLE COLOR FILTER

TECHNICAL FIELD

The present invention relates to a color filter used for color implementation in an image display device, and more particularly, to a flexible color filter having flexibility.

BACKGROUND ART

As the Internet is universalized and the amount of communicable information explosively increases, a ubiquitous display environment in which information can be obtained anytime anywhere will be created in the future. Accordingly, the role of portable displays such as notebook computers, electronic notebooks, PDAs, and the like, which are information output media, has become important. In order to realize such a ubiquitous display environment, it is required that the display is portable so that information can be directly obtained at a desired time and place, and simultaneously a screen is large so that various types of multimedia information can be displayed. Therefore, in order to satisfy both portability and large-screen characteristics, it is necessary to develop a display that is provided with flexibility so it can be unfolded and used when functioning as a display and folded for storage when carried.

A liquid-crystal display (LCD) and an organic light-emitting diode (OLED) are representative types of a flat display device widely used at present.

An OLED has advantages of implementing a very light and thin screen and having a wide color reproduction range, a high response speed, and a high contrast ratio (CR) compared to an existing LCD. In addition, an OLED is currently being actively developed as the most suitable display to implement a flexible display.

In particular, a white organic light-emitting diode (WOLED) using a white light source instead of a conventional blue light source has high efficiency, high resolution, and a long-life characteristic, can implement a large-area high-definition display, and also can be applied to general lighting in many different ways. Therefore, research thereon has been vigorously conducted by domestic and international researchers.

A WOLED uses a color filter to implement full color. A color filter used herein is manufactured by forming a black matrix layer on a glass substrate and then forming red, green, blue, and white patterns thereon.

However, since a glass substrate used in a color filter is large in weight and is easily broken by external slight impacts, there is a limitation in portability and a large-screen display. For this reason, a plastic substrate having characteristics such as lightweight, impact resistance, and flexibility is used.

Since a flexible display as a next-generation display can be freely twisted, bent, or rolled and thus can be applied to various types of a display such as a mobile/portable display, a wearable/fashionable display, a paper-like display, or the like, research and development have continuously progressed. Therefore, a substrate of various components constituting a flexible display has been changed from a glass substrate to a plastic substrate made of a polymer material.

A plastic substrate having flexibility instead of an existing glass substrate is used and thus there are many advantages in terms of portability and safety compared to an existing glass substrate. Also, in terms of a process, a plastic substrate can be manufactured by a deposition or printing method, and thus manufacturing costs can be reduced. Additionally, unlike an existing sheet unit process, a display device can be manufactured by a roll-to-roll process, and thus can be manufactured at low cost through mass production.

However, since such a plastic substrate has a lower transition temperature than a glass substrate and thus has a high expansion ratio based on a temperature change, there is a problem in which layers that are laminated on the substrate may be broken or deformed.

Korean Patent Publication No. 2012-0082729 relates to a flexible display device and a method of manufacturing the same, which includes forming an etching prevention layer on one surface of a non-flexible substrate; forming a display element on one surface of the etching prevention layer; removing the non-flexible substrate through etching; and attaching a flexible substrate to the other surface of the etching prevention layer, wherein the etching prevention layer includes at least one selected from polysilicon, a metal, and a high-temperature organic insulation film.

However, the prior art, which relates to a flexible color filter manufactured by etching a non-flexible substrate, may have a problem in which an etching prevention layer is damaged in a wet etching process of a non-flexible substrate.

In addition, Korean Patent Publication No. 2008-0062595 relates to a flexible color display device and a method of manufacturing the same, which includes a driving substrate having an alignment key, a plurality of driving elements, and a plurality of pixel electrodes connected to the driving elements, respectively; and an ink substrate having an ink layer arranged on a first surface and a plurality of color filters arranged on a second surface, wherein the color filter corresponds to the pixel electrode by the alignment key.

However, the prior art, which relates to a flexible color display device manufactured by directly arranging a pixel electrode and a color filter on a flexible substrate, may have a problem in which a laminating structure is broken by an expansion ratio based on a temperature change due to a lower transition temperature of a flexible substrate than that of glass.

PRIOR-ART DOCUMENTS

Patent Documents

Korean Patent Publication No. 2012-0082729 (Jul. 24, 2012; LG Display Co., Ltd.)
Korean Patent Publication No. 2008-0062595 (Jul. 3, 2008; LG Display Co., Ltd.)

DISCLOSURE OF INVENTION

Technical Problem

The present invention is designed to solve the problems of the prior art, and it is an object of the present invention to provide a flexible color filter which can prevent damage to and cracking in a pixel layer by using a specific protective layer and can have excellent solvent resistance, light resistance, and transmittance.

Solution to Problem

In order to accomplish the above objective, a flexible color filter according to the present invention comprises a separation layer, a protective layer, a black matrix layer, and a pixel layer, which are sequentially laminated. Here, the protective layer comprises one or more polymers selected from polymers represented by the following Chemical Formula 1 or the following Chemical Formula 2:

[Chemical Formula 1]

[Chemical Formula 2]

The substituents in Chemical Formulas 1 and 2 are as defined in this specification.

Advantageous Effects of Invention

As described above, a flexible color filter according to the present invention can prevent damage to and cracking in a pixel layer by using a specific protective layer and can have improved solvent resistance, light resistance, and transmittance.

MODE FOR THE INVENTION

Hereinafter, the present invention will be described in detail.

A flexible color filter 100 according to the present invention comprises a separation layer 105, a protective layer 107, a black matrix layer 113, and a pixel layer 109, which are sequentially laminated. Here, the protective layer 107 comprises one or more polymers selected from polymers represented by the following Chemical Formula 1 or the following Chemical Formula 2.

For flexibility of the flexible color filter in the present invention, a polymer material of each layer is specified and such a layer including the polymer material is referred to as an organic layer for convenience. Such an organic layer comprises at least one layer selected from the group consisting of a base film 101, a separation layer 105, a protective layer 107, a black matrix layer 113, a pixel layer 109, a planarization layer, and a combination thereof. Such an organic layer may preferably be the separation layer and the protective layer, more preferably, the separation layer.

As the base film 101, a film commonly used as an optical transparent film may be used without limitation, but, among these films, a film having excellent flexibility, transparency, thermal stability, a moisture barrier property, phase difference uniformity, isotropy, and the like is preferably used. By using the base film 101, damage to a color filter may be prevented and a color filter may be easily handled during a process of manufacture, transportation, and storage.

A material of the base film 101 may be a polymer material or commonly used polyethylene terephthalate, polyethylene, polystyrene, polycarbonate, polyimide, or the like.

The separation layer 105 is a layer formed for peeling off a glass substrate on which a color filter is formed, and needs to be separable from the glass substrate for manufacture of a color filter through physical force.

Therefore, the separation layer 105 preferably has a peel strength of 1 N/25 mm or less, more preferably 0.1 N/25 mm or less with respect to a glass substrate. When the peel strength of the separation layer 105 is within these ranges, a glass substrate is easily removed later, and lifting of a surface or detachment of a part does not occur. For this reason, properties thereof may also not be affected.

In addition, the separation layer 105 preferably has a thickness ranging from 1 to 1000 nm, more preferably 1 to 100 nm. When a thickness of the separation layer 105 is below these ranges, a problem may occur during a peeling process. On the other hand, when a thickness thereof is above these ranges, workability and quality may be degraded during a process following a peeling process.

The separation layer 105 preferably has a surface energy ranging from 30 to 70 mN/m after a peeling process. Here, the surface energy is a factor that is related to a contact angle. When a surface energy thereof is within this range after a peeling process, low wettability is exhibited and adhesiveness may be improved due to an excellent coating property of a composition of an adhesive layer formed later.

As a method of coating the separation layer 105, a conventional wet coating method may be used to obtain a desired thickness. Here, in the wet coating method, a coating device such as a roll coater, a spin coater, a slit and spin coater, a slit coater (also referred to as a die coater), an inkjet, or the like may be used.

In addition, a curing process is performed by heating through an oven, a hot plate, and the like. Temperature and time conditions of the curing process may be varied according to a composition, but the curing process may be performed through heat treatment, for example, at 80 to 250° C. for 10 to 120 minutes.

The protective layer 107 may be formed on the separation layer 105. Since the separation layer 105 is a layer for removing the glass substrate in a physical peeling manner in the latter half of the process, the separation layer 105 is configured to exhibit very weak peel strength. Therefore, the protective layer 107 needs to be formed in an encapsulated form in which the protective layer 107 wraps both side surfaces of the separation layer 105.

The protective layer 107 according to the present invention comprises one or more polymers selected from polymers represented by the following Chemical Formula 1 or the following Chemical Formula 2.

[Chemical Formula 1]

In Chemical Formula 1, m is an integer ranging from 0 to 2, $R^1$ to $R^4$ each independently represent a hydrogen atom or -Xn-R', wherein X represents a C1 to C5 alkylene group or a carbonyl group, n is 0 or 1, and

R' is selected from the group consisting of a C1 to C6 alkyl group, a C6 to C12 aromatic group, and a polar protic group, wherein the alkyl group and the aromatic group are substituted or unsubstituted with one or more groups selected from the group consisting of a C1 to C12 alkyl group, a C6 to C12 aromatic group, a halogen group, a nitrile group, a nitro group, and an amino group.

The alkyl group mentioned herein comprises a linear type or a branched type, and may be, for example, methyl, ethyl, propyl, isopropyl, butyl, isobutyl, sec-butyl, tert-butyl, amyl, isoamyl, tert-amyl, hexyl, heptyl, octyl, isooctyl, 2-ethylhexyl, tert-octyl, nonyl, isononyl, decyl, isodecyl, or the like. Among these, a C1 to C12 alkyl group is preferable.

The aromatic group mentioned herein comprises an aromatic hydrocarbon group and an aromatic heterocyclic group. Here, the aromatic hydrocarbon group may be, for example, a phenyl group, a naphthyl group, or the like. Among these, a C1 to C12 aromatic group is preferable.

The polar protic group mentioned herein may be a polar group having an oxygen atom, such as a carboxyl group (a hydroxyl carbonyl group), a sulfonic acid group, a phosphate group, a hydroxyl group, and the like, a polar group having a nitrogen atom, such as a primary amino group, a secondary amino group, a primary amide group, a secondary amide group (an imide group), and the like, or a polar group having a sulfur atom, such as a thiol group and the like. Among these, the polar group having an oxygen atom is preferable, and the carboxyl group is more preferable.

[Chemical Formula 2]

In Chemical Formula 2, k is an integer ranging from 0 to 2, and $R^5$ and $R^6$ are taken together with two carbon atoms to which they are attached to form a 3- or 5-membered heterocyclic structure containing an oxygen atom or a nitrogen atom, optionally substituted with one or more groups selected from the group consisting of a C1 to C20 alkyl group, a C6 to C20 aromatic group, a halogen group, a nitrile group, a nitro group, and an amino group.

In addition, a polymer in the protective layer 107 preferably has a weight average molecular weight (Mw) ranging from 5,000 to 150,000. When the weight average molecular weight (Mw) thereof is within this range, there is an effect of stability with respect to cracking.

Additionally, the protective layer 107 preferably has a glass transition temperature (Tg) ranging from 100 to 250° C. When the glass transition temperature thereof is within this range, it is possible to reduce a decrease in mechanical strength occurring at high temperature and have excellent viscosity. The protective layer 107 preferably has an elastic modulus ranging from 2.8 to 4.5 GPa and a transmittance ranging from 85 to 95%. When the elastic modulus and transmittance thereof are within these ranges, it is possible to be stable with respect to cracking during a peeling process and suppress thermal damage such as color change and the like.

The black matrix (BM) layer 113 may be formed on the protective layer 107.

The BM layer 113 which is a light blocking layer is positioned between patterned pixels, and may block light in areas except for pixel areas.

The pixel layer 109 may be formed between the BM layer 113 and the protective layer 107.

The pixel layer 109 is a layer for color implementation, and red, green, blue, and white-patterned pixel layers 109 are generally disposed together with the black matrix layer 113. The pixel layer 109 comprises at least one of three primary colors and white. Also, the order of each color in the pixel layer 109 may be optionally selected and may be varied according to the purpose of the forming order of the black matrix layer 113 and the pixel layer 109.

The flexible color filter according to the present invention having the above-described structure may be manufactured, for example, by not directly manufacturing a flexible color filter on a base film made of a plastic material having flexibility but by first forming a separation layer and a protective layer on a glass substrate to manufacture a color filter thereon and then peeling off the separation layer and adhering the base film.

FIGS. 1 to 10 are cross-sectional views of each step in accordance with a method of manufacturing a flexible color filter according to one embodiment of the present invention.

As shown in FIGS. 1 to 10, the flexible color filter according to the present invention is manufactured by forming a separation layer 105 by coating a composition for forming a separation layer on a glass substrate 115; forming a protective layer 107 by coating a composition for forming a protective layer on the separation layer 105 so as to wrap side surfaces of the separation layer 105; forming a black matrix (BM) layer 113 on the protective layer 107 and then forming red, green, blue, and white pixel layers 109 therebetween; forming a planarization layer 111 by coating a composition for forming a planarization layer across the entire surface of the pixel layer 109; attaching a protective film 119 coated with a bonding agent layer 117 on one side thereof to the planarization layer 111; separating the glass substrate 115 and the separation layer 105; adhering a base film coated with an adhesive layer 103 on one side thereof to the separation layer 105; and removing the protective film 119 and the bonding agent layer 117.

Here, the separation layer 105 is a layer for peeling off the glass substrate in the latter half of a process of manufacturing the flexible color filter according to the present invention. When a peel strength with respect to the glass substrate 115 is adjusted to 1 N/25 mm or less, preferably, 0.1 N/25 mm or less, only the glass substrate 115 may be easily removed without damage such as lifting or detachment of a surface. Therefore, through control of the peeling property of the separation layer according to the present invention, a peeling process is much more economical and stable, and also physical peeling is more effectively performed compared to the related art in which a target substrate is chemically removed using a laser, an etching solution, or the like.

Hereinafter, each step will be described in detail with reference to drawings.

Figure 1:
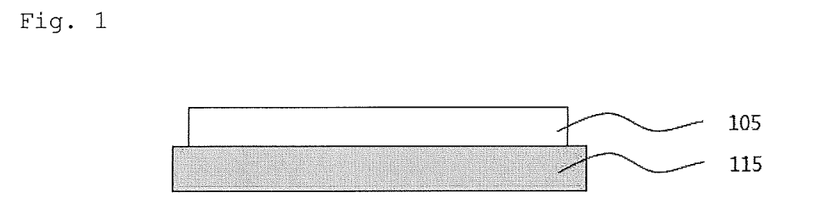
FIGS. 1 to 10 are cross-sectional views of each step in accordance with a method of manufacturing a flexible color filter according to the present invention.

First, a glass substrate 115 is prepared and then a separation layer 105 is formed by coating a composition for forming a separation layer on the glass substrate 115 (see FIG. 1).

The glass substrate 115 is a substrate on which layers constituting a color filter are formed and has appropriate strength so that the substrate is not easily bent or twisted and is fixed during a process of manufacturing a color filter. Also, the glass substrate 115 is a material that is not affected by heat or chemical treatment and thus glass is appropriate.

A thickness of the glass substrate 115 is not specifically limited, but may be, for example, in a range of 50 to 500 µm. When the glass substrate 115 has a thickness below this range, mechanical strength and performance may be degraded. On the other hand, when a thickness thereof is above this range, a problem with processing equipment may occur due to weight during a process.

The composition for forming a separation layer is coated and then cured to form the separation layer 105.

In particular, the separation layer 105 is formed to peel off the glass substrate on which a color filter is formed in a process of manufacturing a flexible color filter according to the present invention. The separation layer 105 needs to be separated from the glass substrate for manufacturing a color filter through physical force, and adhered to the base film 101 through the above-described adhesive layer 103 after separation.

Therefore, the separation layer 105 may have a peel strength of 1 N/25 mm or less, preferably, 0.1 N/25 mm or less with respect to a glass substrate. When the peel strength thereof is within these ranges, the glass substrate 115 is easily removed later and lifting of a surface or detachment of a part does not occur. For this reason, properties thereof may also not be affected.

In addition, the separation layer 105 has a thickness ranging from 1 to 1000 nm, preferably, 1 to 100 nm. When a thickness thereof is below these ranges, a problem may occur during a peeling process. On the other hand, when a thickness thereof is above these ranges, workability and quality may be degraded during a process following a peeling process.

Further, the separation layer 105 preferably has a surface energy ranging from 30 to 70 mN/m after a peeling process. Here, the surface energy is a factor that is related to a contact angle. When a surface energy thereof is within this range after a peeling process, low wettability is exhibited and adhesiveness may be improved due to an excellent coating property of a composition of an adhesive layer formed later.

As a coating method, a conventional wet coating method may be used to obtain a desired thickness. Here, in the wet coating method, a coating device such as a roll coater, a spin coater, a slit and spin coater, a slit coater (also referred to as a die coater), an inkjet, or the like may be used.

A curing process is performed by heating through an oven, a hot plate, and the like. Temperature and time conditions of the curing process may be varied according to a composition, but the curing process may be performed through heat treatment, for example, at 80 to 250° C. for 10 to 120 minutes.

Figure 2:
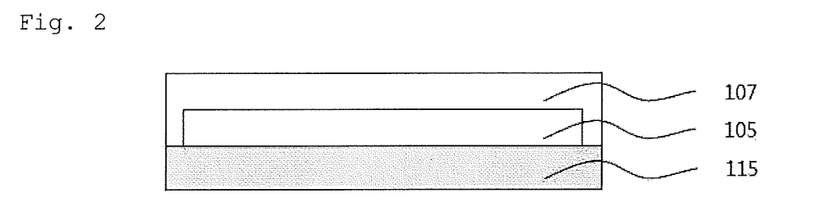

Next, a protective layer 107 is formed by coating the composition for forming a protective layer on the separation layer 105 formed by the above-described process so as to wrap side surfaces of the separation layer (see FIG. 2).

As described above, since the separation layer 105 is a layer for removing the glass substrate in a physical peeling manner in the latter half of the process, the separation layer 105 is configured to exhibit very weak peel strength. Therefore, the protective layer 107 needs to be formed in an encapsulated form in which the protective layer 107 wraps both side surfaces of the separation layer 105.

A coating method and a curing process of the composition for a protective layer are as described above.

Figure 3:
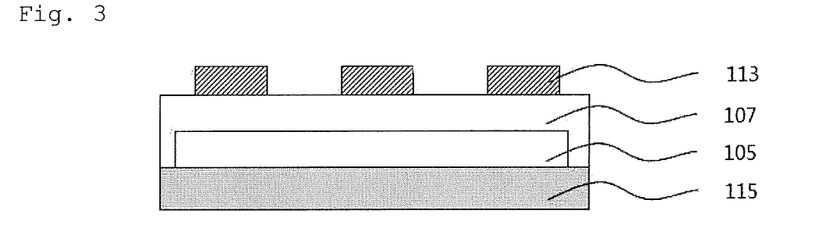
Figure 4:
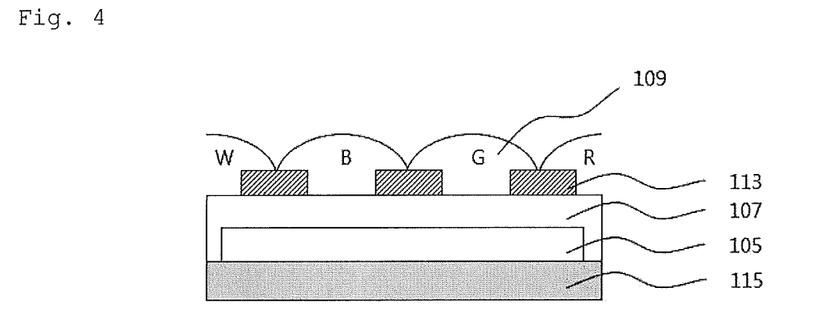

Next, a black matrix (BM) layer 113 is formed on the protective layer 107 formed by the above-described process, and red, green, blue, and white pixel layers 109 are formed therebetween (see FIGS. 3 and 4).

The pixel layer 109 is a layer for color implementation, and red, green, blue, and white-patterned pixel layers are generally disposed together with the black matrix layer 113. The pixel layer 109 comprises at least one of three primary colors and white. The black matrix layer 113 which is a light blocking layer is positioned between patterned pixels, and blocks light in areas except for pixel areas.

The black matrix layer 113 is formed on the protective layer 107 so as to divide a portion for forming a pixel, and then each composition for forming a pixel layer for implementing a color is applied therebetween and the pixel layer is formed so as to have a predetermined pattern through exposure, development, and thermal curing. The order of each color in the pixel layer may be optionally selected and also varied according to the purpose of the forming order of the black matrix layer 113 and the pixel layer 109.

A coating method and a curing process of the black matrix layer 113 and the pixel layer 109 are as described above.

Figure 5:
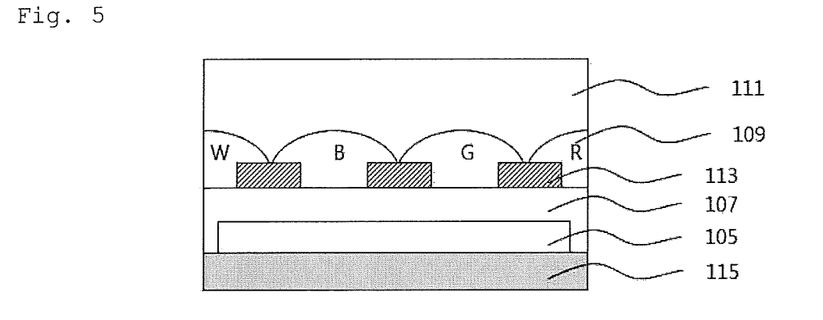

Next, a planarization layer 111 is formed by coating a composition for forming a planarization layer across the entire surface of the pixel layer 109 formed by the above-described process (see FIG. 5).

The planarization layer 111 is a layer for correcting the level difference of the pixel layer 109 and improving flatness, and is also called an overcoating layer (OC layer).

Such a planarization layer 111 is a layer for protecting the patterned pixel layer and planarizing the surface of a color filter upon the later formation of a pixel electrode, and is formed across the entire surface of the pixel layer 109.

A material of the planarization layer 111 is not specifically limited in the present invention, but may be commonly used polyacrylate, polyimide, polyester, or the like.

A coating method and a curing process of the planarization layer 111 are as described above.

Figure 6:
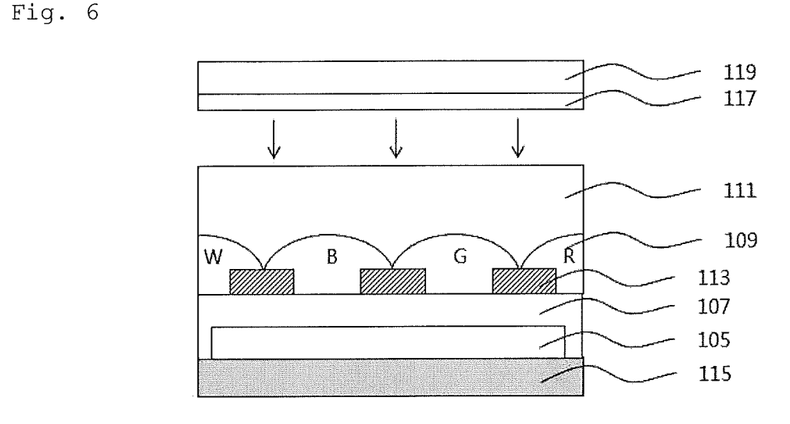

Next, a protective film 119 applied with a bonding agent layer 117 on one side thereof is attached to the planarization layer 111 (see FIG. 6).

As the protective film 119, a material, whose property is controlled to have appropriate mechanical strength, thermal stability, a moisture barrier property, and transparency, is used to protect the flexible color filter according to the present invention. For example, polyethylene, polypropylene, polystyrene, polyethylene terephthalate, polybutylene terephthalate, polyethylene naphthalate, polyetherimide, polyvinyl chloride, or the like may be used.

The bonding agent layer 117 is not specifically limited in the present invention, but compositions commonly used in the art may be used. For example, one type selected from the group consisting of an acrylic resin, a silicone resin, polyester, polyurethane, polyamide, polyvinyl ether, a modified polyolefin, a vinyl acetate/vinyl chloride copolymer, epoxy, fluorine, rubber, and a combination thereof may be used.

The bonding agent layer 117 may be formed by being directly applied on the protective film 119 or attaching a bonding sheet on the protective film 119. Also, thicknesses of the protective film 119 and the bonding agent layer 117 may be adjusted in accordance with a material and bonding strength of the protective film.

Figure 7:
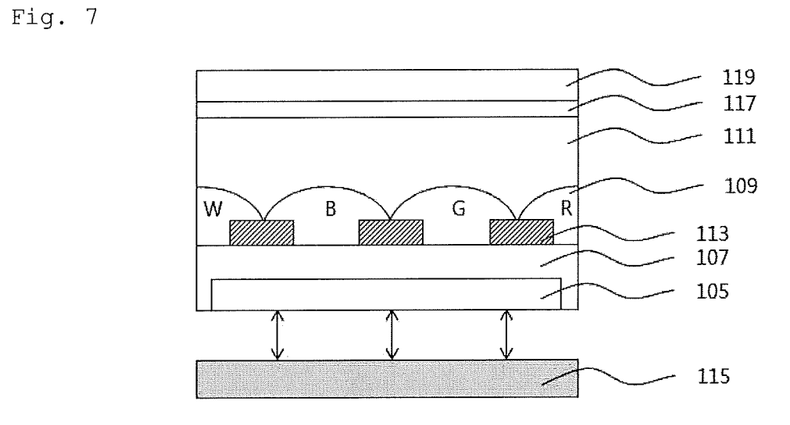

Next, the glass substrate 115 and the separation layer 105 are separated (see FIG. 7).

In order to remove the glass substrate 115 used to manufacture a color filter, the separation layer 105 is peeled off.

The peeling process is performed at room temperature, and the glass substrate may be removed in a physically peeling manner using the weak peel strength of the separation layer 105 with respect to the glass substrate as described above. For example, the peeling process may be performed by fixing the glass substrate and the remaining layers based on the separation layer and then separating the glass substrate and the separation layer through physical force.

Figure 8:
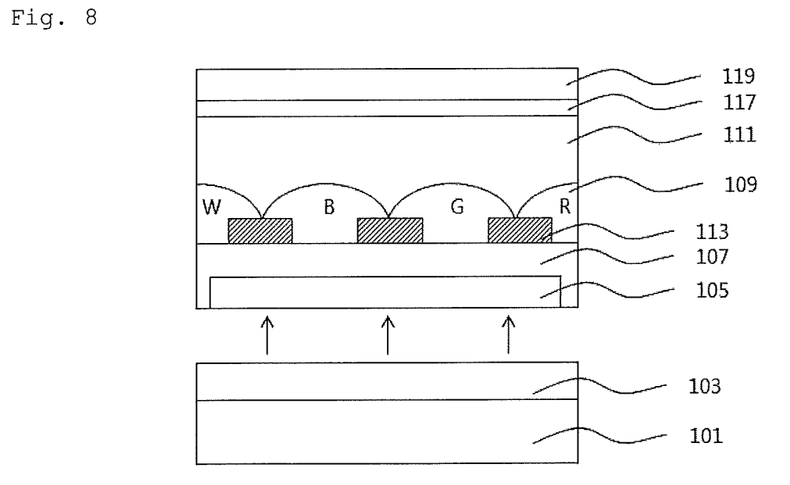

Next, the base film 101 applied with the adhesive layer 103 on one side thereof is adhered to the separation layer 105 (see FIG. 8).

As the base film 101, a film commonly used as an optical transparent film may be used without limitation, but among these films, a film having excellent flexibility, transparency, thermal stability, a moisture barrier property, phase difference uniformity, isotropy, and the like is preferably used. By using the base film 101, damage to a color filter may be prevented and a color filter may be easily handled during a process of manufacture, transportation, and storage.

For example, polyethylene terephthalate, polyethylene, polystyrene, polycarbonate, polyimide, and the like may be available as a material of the base film 101.

The adhesive layer 103 is used to adhere the base film 101 and the separation layer 105 of the color filter and disposed on one side of the base film 101 or the separation layer 105. Here, a photocurable adhesive is usable as an adhesive, which does not require an additional drying process after photocuring, simplifies a manufacturing process, and thus improves productivity. The photocurable adhesive used in the present invention may be formed using a photocurable adhesive used in the art without specific limitation. For example, a composition including an epoxy compound or an acrylic monomer may be included.

In addition, in the photocuring of the adhesive layer 103, electron beams, proton beams, neutron beams, or the like in addition to electromagnetic waves such as far ultraviolet rays, ultraviolet rays, near ultraviolet rays, infrared rays, X-rays, γ-rays, and the like may be used, but curing by irradiation with ultraviolet rays is advantageous in terms of a curing rate, the ease of obtaining an irradiation device, costs, and the like.

Additionally, as a light source during the irradiation with ultraviolet rays, a high-pressure mercury lamp, an electrodeless lamp, an ultra-high-pressure mercury lamp, a carbon arc lamp, a xenon lamp, a metal halide lamp, a chemical lamp, a blacklight, or the like may be used.

Further, in order to improve adhesiveness between the layers, the base film and/or the separation layer are surface-treated by corona treatment, flame treatment, plasma treatment, irradiation with ultraviolet rays, primer applying treatment, saponification treatment, or the like.

Figure 9:
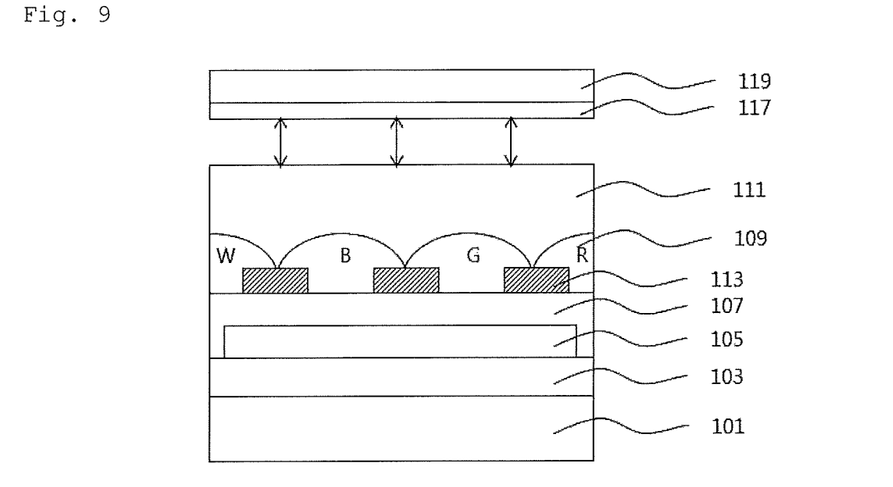

Next, the protective film 119 and the bonding agent layer 117 that are attached to one another are removed (see FIG. 9).

Figure 10:
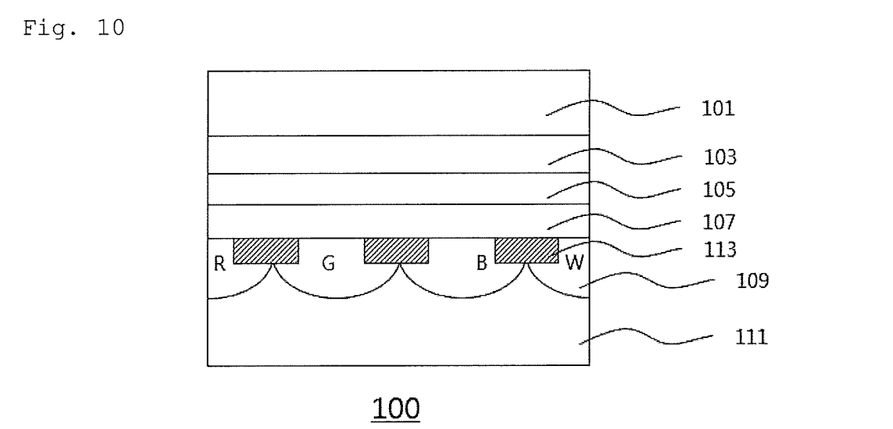

In order to later laminate a touch sensor, a POL-integrated touch film, or window film, the protective film 119 and the bonding agent layer 117 that were attached to one another in a previous process are removed to finally obtain the flexible color filter 100 according to the present invention as shown in FIG. 10.

Referring to FIG. 10, the flexible color filter 100 according to a manufacturing method of the present invention has a structure in which the base film 101; the adhesive layer 103; the separation layer 105; the protective layer 107; the red, green, blue, and white-patterned pixel layers 109; and the planarization layer 111 are sequentially laminated.

As described above, for flexibility of the flexible color filter, a polymer material of each layer constituting the flexible color filter is specified and such a layer including the polymer material is referred to as an organic layer for convenience in the present invention. Such an organic layer comprises at least one layer selected from the group consisting of a base film 101, a separation layer 105, a protective layer 107, a planarization layer 111, and a combination thereof. Such an organic layer may preferably be a separation layer 105 or a protective layer 107, more preferably, a separation layer 105.

A material of the organic layer may be a polymer material. Preferably, the polymer material comprises one material selected from the group consisting of polyacrylate, polymethacrylate (e.g., PMMA), polyimide, polyamide, polyamic acid, polyvinyl alcohol, polyolefins (e.g., PE and PP), polystyrene, polynorbornene, polymaleimide, polyazobenzene, polyesters (e.g., PET and PBT), polyarylate, polyphthalimidine, polyphenylene phthalamide, poly (vinyl cinnamate), polycinnamate, a coumarin-based polymer, a chalcone-based polymer, an aromatic acetylene-based polymer, a phenylmaleimide copolymer, a copolymer thereof, and a blend thereof.

The polymer material can be applied to at least one layer selected from the group consisting of the base film 101, the separation layer 105, the protective layer 107, the planarization layer 111, and a combination thereof. For example, the same or similar polymer may be applied to all layers, or polyacrylate may be applied to only the separation layer 105 and a material known in the art may be applied to the remaining layers.

A thickness of each of the organic layers is not specifically limited in the present invention, but a thinner organic layer is advantageous to achieve a slim flexible color filter and flexible display to which the flexible color filter is applied. Therefore, a thickness of each of the organic layer is preferably a few μm or less.

As described above, in a process of manufacturing the flexible color filter according to the present invention, the color filter is formed on the glass substrate through a high-temperature process, the glass substrate is removed using the separation layer at room temperature, and then the base film made of plastic is laminated.

In particular, as peel strength of the separation layer with respect to the glass substrate is limited to a predetermined range, a peeling process is easily performed, the glass substrate is completely removed, and lifting of a surface or detachment of a part does not occur after the peeling process.

Therefore, the flexible color filter manufactured by the method according to the present invention may prevent thermal deformation of a conventional base film, and thus ensure high reliability without a decrease in quality or a malfunction caused by thermal deformation. Also, the flexible color filter may implement a more precise pixel due to a precise and elaborate dimension of a pattern thereof. Also, various plastic materials may be applied as a base film depending on the purpose.

Also, the flexible color filter manufactured by the method according to the present invention can be applied to a flexible white organic light-emitting display.

Specifically, the flexible color filter manufactured by the method according to the present invention and a touch sensor, a POL-integrated touch film, or window film may be included on the substrate of a flexible white organic light-emitting diode (WOLED).

Therefore, a display device including the flexible color filter according to the present invention solves the problem caused by thermal deformation of a plastic material, and thus can be applied to various fields such as an automation device, a smart phone, a display, a solar cell, electronic paper, and the like, all of which require bendability and flexibility, and used in various forms.

Hereinafter, the present invention will be described in more detail with reference to exemplary embodiments. However, the exemplary embodiments should be considered in descriptive sense only, and the present invention is not limited thereto. The exemplary embodiments may be appropriately changed and modified without departing from the scope of the present invention by those skilled in the art.

Synthesis Example 1: Polymer Compound A-1

60 parts by weight of 8-hydroxy carbonyl tetracyclododecene, 40 parts by weight of N-phenyl-(5-norbornene-2,3-dicarboximide), 1.3 parts by weight of 1-hexene, 0.05 parts by weight of (1,3-dimethylimidazolidin-2-ylidene)(tricyclohexylphosphine)benz ylidene ruthenium dichloride, and 400 parts by weight of tetrahydrofuran were put into a glass pressure reactor that had been substituted with nitrogen, and stirred to induce a reaction at 70° C. for 2 hours, thereby obtaining a resin solution (a) (solid concentration: about 20%). The resin solution (a) was transferred into an autoclave equipped with a stirrer to induce a reaction under a hydrogen pressure of 4 MPa at a temperature of 150° C. for 5 hours, thereby obtaining a resin solution (b) (solid concentration: about 20%) including a hydrogenated resin (hydrogenation rate: 99%).

Next, 100 parts by weight of the resin solution (b) and 1 part by weight of activated carbon powder were put into an autoclave made of a heat resisting material to induce a reaction under a hydrogen pressure of 4 MPa at 150° C. for 3 hours. After the reaction was completed, a resulting solution was filtered using a fluoro-resin filter having a pore diameter of 0.2 μm to separate the activated carbon, thereby obtaining a resin solution (c). Here, the solution was smoothly filtered.

Subsequently, the resin solution (c) was added to ethyl alcohol. A substance thus produced was dried to obtain a polymer compound A-1. The polymer compound A-1 had a polyisoprene-converted weight average molecular weight (Mw) of 5,500, a number average molecular weight (Mn) of 3,200, and a glass transition temperature (Tg) of 187° C. Also, a hydrogenation rate was 99%.

Synthesis Example 2: Polymer Compound A-2

100 parts by weight of 8-methyl-8-methoxycarbonyltetracyclo[4.4.0.1$^{2,5}$0.1$^{7,10}$]dodeca-3-en, 1.3 parts by weight of 1-hexene, 0.05 parts by weight of 1,3-dimethylimidazoline-2-ylidene (tricyclohexylphosphine)benzylidene ruthenium dichloride, and 400 parts by weight of cyclohexane were put into a glass pressure reactor that had been substituted with nitrogen.

This mixture was subjected to polymerization and hydrogenation in the same manner as in Synthesis Example 1 to obtain a resin, which had a Mw of 5,300, a Mn of 3,200, and a glass transition temperature (Tg) of 197° C. Also, a hydrogenation rate was 99%.

Next, 100 parts by weight of the resin thus obtained, 100 parts by weight of N-methylpyrrolidone, 500 parts by weight of propylene glycol, and 84.5 parts by weight of 85% potassium hydroxide were put into a reactor. This mixture was heated and stirred at 190° C. for 4.5 hours. A resulting solution was added to a mixed solution of a large amount of water, tetrahydrofuran, and hydrochloric acid to solidify the hydrolyzate. A solidified polymer was washed with water and dried to obtain a hydrolyzed polymer compound A-2. Here, a hydrolysis rate of the polymer compound A-2 was 95%.

Synthesis Example 3: Polymer Compound A-3

100 parts by weight of 5-(2-hydroxyethoxycarbonyl)bicyclo[2.2.1]hepto-2-en, 1.3 parts by weight of 1-hexene, 0.05 parts by weight of 1,3-dimethylimidazolidin-2-ylidene (tricyclohexylphosphine)benzyl idene ruthenium dichloride, and 400 parts by weight of tetrahydrofuran were put into a glass pressure reactor that had been substituted with nitrogen.

This mixture was subjected to polymerization and hydrogenation in the same manner as in Synthesis Example 1 to obtain a polymer compound A-3, which had a Mw of 5,500, a Mn of 3,300, and a glass transition temperature (Tg) of 199° C. Also, a hydrogenation rate was 99%.

Synthesis Example 4: Polymer Compound A-4

100 parts by weight of 8-ethylidene-tetracyclo[4.4.0.1$^{2,5}$.1$^{7,10}$]deca-3-en, 1.3 parts by weight of 1-hexene, 0.05 parts by weight of 1,3-dimethylimidazolidin-2-ylidene(tricyclohexylphosphine)benzyl idene ruthenium dichloride, and 400 parts by weight of cyclohexane were put into a glass pressure reactor that had been substituted with nitrogen.

This mixture was subjected to polymerization and hydrogenation in the same manner as in Synthesis Example 1 to obtain a polymer compound A-4, which had a Mw of 5,500, a Mn of 3,200, and a glass transition temperature (Tg) of 198° C. Also, a hydrogenation rate was 99%.

Synthesis Example 5: Polymer Compound A-5

A flask equipped with a stirrer, a thermometer, a reflux condenser, a dropping lot, and a nitrogen inlet tube was prepared. 45 parts by weight of N-benzyl maleimide, 45 parts by weight of methacrylic acid, 10 parts by weight of tricyclodecyl methacrylate, 4 parts by weight of t-butylperoxy-2-ethylhexanoate, and 40 parts by weight of propylene glycol monomethyl ether acetate (hereinafter, referred to as PGMEA) were input and mixed with stirring to prepare a monomer dropping lot. Also, 6 parts by weight of n-dodecanethiol and 24 parts by weight of PGMEA were input and mixed with stirring to prepare a chain-transfer agent dropping lot. Afterward, 395 parts by weight of PGMEA was put into the flask, the inside of which was purged with nitrogen, and then a temperature of the flask was increased to 90° C. with stirring. Subsequently, a monomer and a chain-transfer agent were dropped from the dropping lots. The droppings were performed at a constant temperature of 90° C. for 2 hours, respectively. At 1 hour after the droppings, a temperature was increased to 110° C. and maintained for 3 hours. Afterward, a gas inlet tube was introduced and bubbling of a mixed gas of oxygen/nitrogen (5/95 (v/v)) was started. Subsequently, 10 parts by weight of glycidyl methacrylate, 0.4 parts by weight of 2,2'-methylenebis(4-methyl-6-t-butylphenol), and 0.8 parts by weight of triethylamine were put into the flask to continuously induce a reaction at 110° C. for 8 hours. Afterward, the flask was cooled to room temperature to obtain a polymer compound A-5 having a solid content of 29.1 wt %, a weight average molecular weight of 32,000, a glass transition temperature (Tg) of 140° C., and an acid value of 114 mgKOH/g.

Synthesis Example 6: Polymer Compound A-6

A flask equipped with a stirrer, a thermometer, a reflux condenser, a dropping lot, and a nitrogen inlet tube was prepared. 300 parts by weight of propylene glycol monomethyl ether acetate (PGMEA) was put thereinto and then the flask was heated to 75° C. with stirring. A solution prepared by dissolving 62.5 parts by weight of 3,4-epoxy-8-(acryloyloxy)tricycloyl[5.2.1.02,6]decane (EDCPA), 15.1 parts by weight of acrylic acid (AA), and 22.4 parts by weight of vinyltoluene in 170 parts by weight of PGMEA was dropped into the flask using a dropping lot over 5 hours.

Meanwhile, a solution prepared by dissolving 30 parts by weight of azobisisobutyronitrile, as a polymerization initiator, in 200 parts by weight of PGMEA was dropped into the flask using a separate dropping lot over 5 hours. After dropping of the polymerization initiator was completed, a temperature of the flask was maintained for about 4 hours and then cooled to room temperature to obtain a polymer compound A-6 having a solid content of 37.6 wt %, a weight average molecular weight of 10740, a glass transition temperature (Tg) of 160° C., and an acid value of 111 mgKOH/g.

Synthesis Example 7: Polymer Compound A-7

A flask equipped with a stirrer, a thermometer, a reflux condenser, a dropping lot, and a nitrogen inlet tube was prepared. 15 parts by weight of acetoacetoxyethyl methacrylate, 15 parts by weight of hydroxy methacryl acrylate, 45 parts by weight of N-benzylmaleimide, 15 parts by weight of methacrylic acid, 10 parts by weight of tricyclodecyl methacrylate, 4 parts by weight of t-butylperoxy-2-ethylhexanoate, and 40 parts by weight of propylene glycol monomethyl ether acetate (PGMEA) were input and then mixed with stirring to prepare a monomer dropping lot. Also, 6 parts by weight of n-dodecanethiol and 24 parts by weight of PGMEA were input and then mixed with stirring to prepare a chain-transfer agent dropping lot.

Afterward, 395 parts by weight of PGMEA was put into the flask, the inside of which was purged with nitrogen, and then a temperature of the flask was increased to 90° C. with stirring. Subsequently, a monomer and a chain-transfer agent were dropped from the dropping lots. The droppings were performed at a constant temperature of 90° C. for 2 hours, respectively. At 1 hour after the droppings, a temperature was increased to 110° C., maintained for 3 hours, and then cooled to room temperature to obtain a polymer compound A-7 having a solid content of 29.1 wt %, a weight average molecular weight of 25,000, a glass transition temperature (Tg) of 80° C., and an acid value of 140 mgKOH/g.

Weight average molecular weights of the polymer compounds according to Synthesis Examples 1 to 7 were measured using gel permeation chromatography (GPC) under the following conditions.

Apparatus: HLC-8120 GPC (manufactured by Tosoh Corporation)
Column: TSK-GELG4000HXL+TSK-GELG2000HXL (connected in series)
Column temperature: 40° C.
Mobile phase solvent: tetrahydrofuran
Flow rate: 1.0 ml/min
Input amount: 50 µl
Detector: RI
Concentration of measured sample: 0.6 wt % (solvent=tetrahydrofuran)
Standard substance for calibration: TSK STANDARD POLYSTYRENE F-40, F-4, F-1, A-2500, and A-500 (manufactured by Tosoh Corporation)

Glass transition temperatures (Tg) of the polymer compounds according to Synthesis Examples 1 to 7 were measured by increasing the temperature 10° C./min using differential scanning calorimetry.

Manufacture of Flexible Color Filter

A composition for forming a separation layer described in the following Table 1 was coated on a glass substrate and cured at 150° C. for 20 minutes to form a separation layer having a thickness of 0.3 µm. Subsequently, a protective film was coated to wrap both side surfaces of the separation layer and subjected to heat treatment at 230° C. for 20 minutes to form a protective layer having a thickness of 3 µm.

Next, a black matrix layer (TBK-04) and a patterned pixel layer (TR-800, YG-800 and YB-800) were formed on the protective layer.

Subsequently, a planarization film (DW-LT09) was formed on the pixel layer, and then the planarization layer and a protective film (15 µmPSA/38 µmPET commercially available from Fujimori Sangyo Co., Ltd.) coated with a bonding agent were attached.

Subsequently, the glass substrate was peeled off from the separation layer at room temperature for separation, and then a base film to which an adhesive (KR15P commercially available from ADEKA Corporation) was applied was laminated to manufacture a color filter. Afterward, transmittance, elastic modulus, cracking in a coated film, light resistance, and solvent resistance of the substrate were measured.

TABLE 1

| Category | Polymer compound | | | | | | | Solvent | Additive | |
| | A-1 | A-2 | A-3 | A-4 | A-5 | A-6 | A-7 | B | C-1 | C-2 |
| --- | --- | --- | --- | --- | --- | --- | --- | --- | --- | --- |
| Example 1 | 17 | — | — | — | — | — | — | 79.5 | 0.5 | 2.5 |
| Example 2 | — | 17 | — | — | — | — | — | 79.5 | 0.5 | 2.5 |
| Example 3 | — | — | 17 | — | — | — | — | 79.5 | 0.5 | 2.5 |
| Example 4 | — | — | — | 17 | — | — | — | 79.5 | 0.5 | 2.5 |
| Example 5 | — | 8.5 | 8.5 | — | — | — | — | 79.5 | 0.5 | 2.5 |
| Example 6 | 8.5 | — | 8.5 | — | — | — | — | 79.5 | 0.5 | 2.5 |
| Example 7 | — | — | 8.5 | 8.5 | — | — | — | 79.5 | 0.5 | 2.5 |
| Comparative Example 1 | — | — | — | — | 17 | — | — | 79.5 | 0.5 | 2.5 |

TABLE 1-continued

| Category | Polymer compound | | | | | | | Solvent | Additive | |
|---|---|---|---|---|---|---|---|---|---|---|
| | A-1 | A-2 | A-3 | A-4 | A-5 | A-6 | A-7 | B | C-1 | C-2 |
| Comparative Example 2 | — | — | — | — | — | 17 | — | 79.5 | 0.5 | 2.5 |
| Comparative Example 3 | — | — | — | — | — | — | 17 | 79.5 | 0.5 | 2.5 |

A-1: Synthesis Example 1
A-2: Synthesis Example 2
A-3: Synthesis Example 3
A-4: Synthesis Example 4
A-5: Synthesis Example 5
A-6: Synthesis Example 6
A-7: Synthesis Example 7
B: MEDG
C-1: F-554, DIC
C-2: EPHE-3150CE, Dicel Experimental Example 1: Thickness Measurement Polymer compounds prepared according to Examples 1 to 7 and Comparative Examples 1 to 3 were applied on glass substrates of soda lime glass having a size of 50 mm×50 mm and a thickness of 700 μm using a spin coater. Subsequently, the resulting substrates were dried at 100° C. for 2 minutes, additionally dried at 230° C. for 30 minutes, and then cooled to manufacture a coated film substrate. The coated substrate thus obtained was manufactured by adjusting applying conditions of a spin coater so as to have a film thickness of 2 μm when the coated substrate was measured at 4-points using a surface profile measurement device (Dektak 8 commercially available from Veeco Instruments Inc.).

Experimental Example 2: Transmittance Measurement

Apart from the film touch sensors according to Examples 1 to 7 and Comparative Examples 1 to 3, only a protective layer was formed on a soda lime glass having a thickness of 700 μm in the same manner as in Examples 1 to 7 and Comparative Examples 1 to 3. Light transmittance, at a wavelength of 550 nm, of the insulating layer was measured using a spectrophotometer (U3210 commercially available from Hitachi High-Technologies Corporation).

Experimental Example 3: Elastic Modulus Measurement

Apart from the film touch sensors according to Examples 1 to 7 and Comparative Examples 1 to 3, a substrate with only a protective layer formed on a soda lime glass having a thickness of 700 μm in the same manner as in Examples 1 to 7 and Comparative Examples 1 to 3 was prepared. The elastic modulus thereof was measured based on KS M ISO 6721-4, results of which are shown in the following Table 2.

Experimental Example 4: Cracking Measurement on Coated Film

Apart from the film touch sensors according to Examples 1 to 7 and Comparative Examples 1 to 3, a separation layer was applied on a soda lime glass having a thickness of 700 μm and then polymer resins according to Examples 1 to 7 and Comparative Examples 1 to 3 were applied on the separation layer. The soda lime glass was peeled off using 3 M #55 tape (a width of 25 mm/a length of 10 cm). In this case, whether cracking in a transferred film occurs was observed with the naked eye, results of which are shown in the following Table 2.

O: no cracking
X: cracking

Experimental Example 5: Light Resistance Measurement

Apart from the film touch sensors according to Examples 1 to 7 and Comparative Examples 1 to 3, a substrate with only a protective layer formed on a soda lime glass having a thickness of 700 μm in the same manner as in Examples 1 to 7 and Comparative Examples 1 to 3 was prepared. A change in transmittance thereof was measured by radiating light for 200 hours using a xenon lamp, results of which are shown in the following Table 2.

O: 3 $\Delta$T % or less
Δ: 4 to 8 $\Delta$T % or less
X: 9 $\Delta$T % or more

Experimental Example 6: Solvent Resistance Measurement

Apart from the film touch sensors according to Examples 1 to 7 and Comparative Examples 1 to 3, a substrate with only a protective layer formed on a soda lime glass having a thickness of 700 μm in the same manner as in Examples 1 to 7 and Comparative Examples 1 to 3 was prepared. The substrate was immersed in PGMEA, heated at 100° C. for 30 minutes, and then a change in a thickness of a film was measured, results of which are shown in the following Table 2.

O: 98% or more
Δ: 95% to 98%
X: 95% or less

Experimental Example 7: Glass Transition Temperature (Tg) Measurement

Apart from the film touch sensors according to Examples 1 to 7 and Comparative Examples 1 to 3, a substrate with only a protective layer formed on soda lime glass having a thickness of 700 μm in the same manner as in Examples 1 to 7 and Comparative Examples 1 to 3 was prepared. The substrate was cut to an applicable size for use as a sample of a differential scanning calorimeter (DSC) apparatus, and the energy input difference was measured as a function of temperature while changing the temperature of the sample using the DSC, results of which are shown in the following Table 2.

TABLE 2

| Category | Thickness (μm) | Transmittance (T %) | Elastic modulus (MPa) | Cracking in coated film | Light resistance (ΔT %) | Solvent resistance | Glass transition temperature (Tg) |
|---|---|---|---|---|---|---|---|
| Example 1 | 2 | 97 | 400 | ○ | 0.3 | ○ | 100 |
| Example 2 | 2 | 98 | 390 | ○ | 0.4 | ○ | 120 |
| Example 3 | 2 | 99 | 420 | ○ | 1 | ○ | 150 |
| Example 4 | 2 | 98 | 380 | ○ | 0.4 | ○ | 180 |
| Example 5 | 2 | 98 | 390 | ○ | 0.6 | ○ | 140 |
| Example 6 | 2 | 97 | 405 | ○ | 0.55 | ○ | 170 |
| Example 7 | 2 | 97 | 400 | ○ | 0.5 | ○ | 120 |
| Comparative Example 1 | 2 | 85 | 480 | X | 5 | X | 90 |
| Comparative Example 2 | 2 | 90 | 550 | X | 12 | X | 150 |
| Comparative Example 3 | 2 | 89 | 590 | X | 7 | X | 45 |

Referring to Table 2, it can be seen that, in Examples 1 to 7 of the present invention, excellent transmittance, elastic modulus, light resistance, and solvent resistance are exhibited, and cracking in the coated film does not occur.

| Description of Symbols | |
|---|---|
| 100: flexible color filter | |
| 101: base film | 103: adhesive layer |
| 105: separation layer | 107: protective layer |
| 109: pixel layer | 111: planarization layer |
| 113: black matrix layer | 115: glass substrate |
| 117: bonding agent layer | 119: protective film |

The invention claimed is:

1. A flexible color filter comprising a separation layer, a protective layer, a black matrix layer, and a pixel layer, which are sequentially laminated,
wherein the protective layer comprises one or more polymers selected from polymers represented by the following Chemical Formula 1 or the following Chemical Formula 2:

[Chemical Formula 1]

in Chemical Formula 1,
m is an integer ranging from 0 to 2;
$R^1$ to $R^4$ each independently represent a hydrogen atom or -Xn-R',
wherein X represents a C1 to C5 alkylene group or a carbonyl group;
n is 0 or 1; and
R' is selected from the group consisting of a C1 to C6 alkyl group, a C6 to C12 aromatic group, and a polar protic group, wherein the alkyl group and the aromatic group are substituted or unsubstituted with one or more groups selected from the group consisting of a C1 to C12 alkyl group, a C6 to C12 aromatic group, a halogen group, a nitrile group, a nitro group, and an amino group;

[Chemical Formula 2]

in Chemical Formula 2,
k is an integer ranging from 0 to 2; and
$R^5$ and $R^6$ are taken together with two carbon atoms to which they are attached to form a 3- or 5-membered heterocyclic structure containing an oxygen atom or a nitrogen atom, optionally substituted with one or more groups selected from the group consisting of a C1 to C20 alkyl group, a C6 to C20 aromatic group, a halogen group, a nitrile group, a nitro group, and an amino group.

2. The flexible color filter according to claim 1, wherein the polymer in the protective layer has a weight average molecular weight (Mw) ranging from 5,000 to 150,000.

3. The flexible color filter according to claim 1, wherein the protective layer has a glass transition temperature (Tg) ranging from 100 to 250° C.

4. The flexible color filter according to claim 1, wherein the protective layer has an elastic modulus ranging from 2.8 to 4.5 GPa.

5. The flexible color filter according to claim 1, wherein the protective layer has a transmittance ranging from 85 to 95%.

6. The flexible color filter according to claim 1, further comprising a base film provided on the surface of the separation layer which is opposite to the surface adjacent to the protective layer.

* * * * *